(12) United States Patent
Ge et al.

(10) Patent No.: US 10,505,449 B1
(45) Date of Patent: Dec. 10, 2019

(54) ELECTRIC DRIVE WITH INPUT INDUCTOR BASED VARIABLE VOLTAGE CONVERTER

(71) Applicant: Ford Global Technologies, LLC, Dearborn, MI (US)

(72) Inventors: Baoming Ge, Okemos, MI (US); Lihua Chen, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/131,648

(22) Filed: Sep. 14, 2018

(51) Int. Cl.
  *H02M 3/158* (2006.01)
  *H02P 27/06* (2006.01)
  *B60L 50/51* (2019.01)
  *B60L 50/60* (2019.01)

(52) U.S. Cl.
  CPC .............. *H02M 3/158* (2013.01); *B60L 50/51* (2019.02); *B60L 50/66* (2019.02); *H02P 27/06* (2013.01)

(58) Field of Classification Search
  CPC ...................................................... H02M 3/158
  USPC .................................................... 318/139, 34
  See application file for complete search history.

(56) References Cited

U.S. PATENT DOCUMENTS

| | | | |
|---|---|---|---|
| 7,319,308 B2 * | 1/2008 | Marino | H02M 3/155 |
| | | | 323/222 |
| 9,083,242 B2 | 7/2015 | Barnett et al. | |
| 9,729,059 B1 | 8/2017 | Parto | |
| 2018/0083539 A1 | 3/2018 | Reed | |

* cited by examiner

*Primary Examiner* — David Luo
(74) *Attorney, Agent, or Firm* — David B. Kelley; Brooks Kushman P.C.

(57) ABSTRACT

A vehicle electric drive includes a battery, an inverter, and a power converter electrically between the battery and inverter. The power converter includes series switches activated at a predefined switching frequency, a series capacitor and non-gapped inductor, and an inductor electrically between the non-gapped inductor and series switches. The non-gapped inductor defines an inductance proportional to an inverse of a product of a capacitance of the capacitor and the switching frequency squared.

16 Claims, 5 Drawing Sheets

US 10,505,449 B1

ELECTRIC DRIVE WITH INPUT INDUCTOR BASED VARIABLE VOLTAGE CONVERTER

TECHNICAL FIELD

This disclosure relates to variable voltage converters for electric drive systems.

BACKGROUND

Electrified vehicles, including hybrid, plug-in hybrid, and electric vehicles, are designed to be propelled or partially propelled by one or several electric machines, such as AC induction machines, DC brushless electric machines, and permanent magnetic synchronous machines. A battery pack is included in the electrified vehicles providing electricity to electric machines. Hybrid and plug-in hybrid vehicles also have built-in internal combustion engines, which are able to charge the battery pack and/or propel the electrified vehicle together with electric machines. The battery pack includes multiple battery cells in series and/or in parallel to achieve high voltage and/or high output power to meet the requirements of electric machines. The battery pack also provides power to other equipment and circuits inside of the electrified vehicle, such as the DC-DC converter, on-board generator, and air conditioning system.

SUMMARY

A vehicle electric drive includes a battery, an inverter, and a power converter electrically between the battery and inverter. The power converter includes series inductors, series switches activated at a predefined switching frequency, and a series capacitor and non-gapped inductor. The series inductors and non-gapped inductor have a T configuration. The non-gapped inductor defines an inductance proportional to an inverse of a product of a capacitance of the capacitor and the switching frequency squared.

A vehicle electric drive includes a battery, an inverter, and a converter electrically between the battery and inverter. The converter includes a series capacitor and non-gapped inductor in parallel with the battery, series switches activated at a predefined switching frequency, and an inductor electrically between the non-gapped inductor and series switches. The non-gapped inductor defines an inductance proportional to an inverse of a product of a capacitance of the capacitor and the switching frequency squared.

A vehicle electric drive includes a battery, an inverter, and a power converter electrically between the battery and inverter. The power converter includes series switches activated at a predefined switching frequency, a series capacitor and non-gapped inductor, and an inductor electrically between the non-gapped inductor and series switches. The battery, non-gapped inductor, and inductor share a common terminal. The non-gapped inductor defines an inductance proportional to an inverse of a product of a capacitance of the capacitor and the switching frequency squared.

DETAILED DESCRIPTION

Various embodiments of the present disclosure are described herein. However, the disclosed embodiments are merely exemplary and other embodiments may take various and alternative forms that are not explicitly illustrated or described. The figures are not necessarily to scale; some features may be exaggerated or minimized to show details of particular components. Therefore, specific structural and functional details disclosed herein are not to be interpreted as limiting, but merely as a representative basis for teaching one of ordinary skill in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. However, various combinations and modifications of the features consistent with the teachings of this disclosure may be desired for particular applications or implementations.

Figure 1:
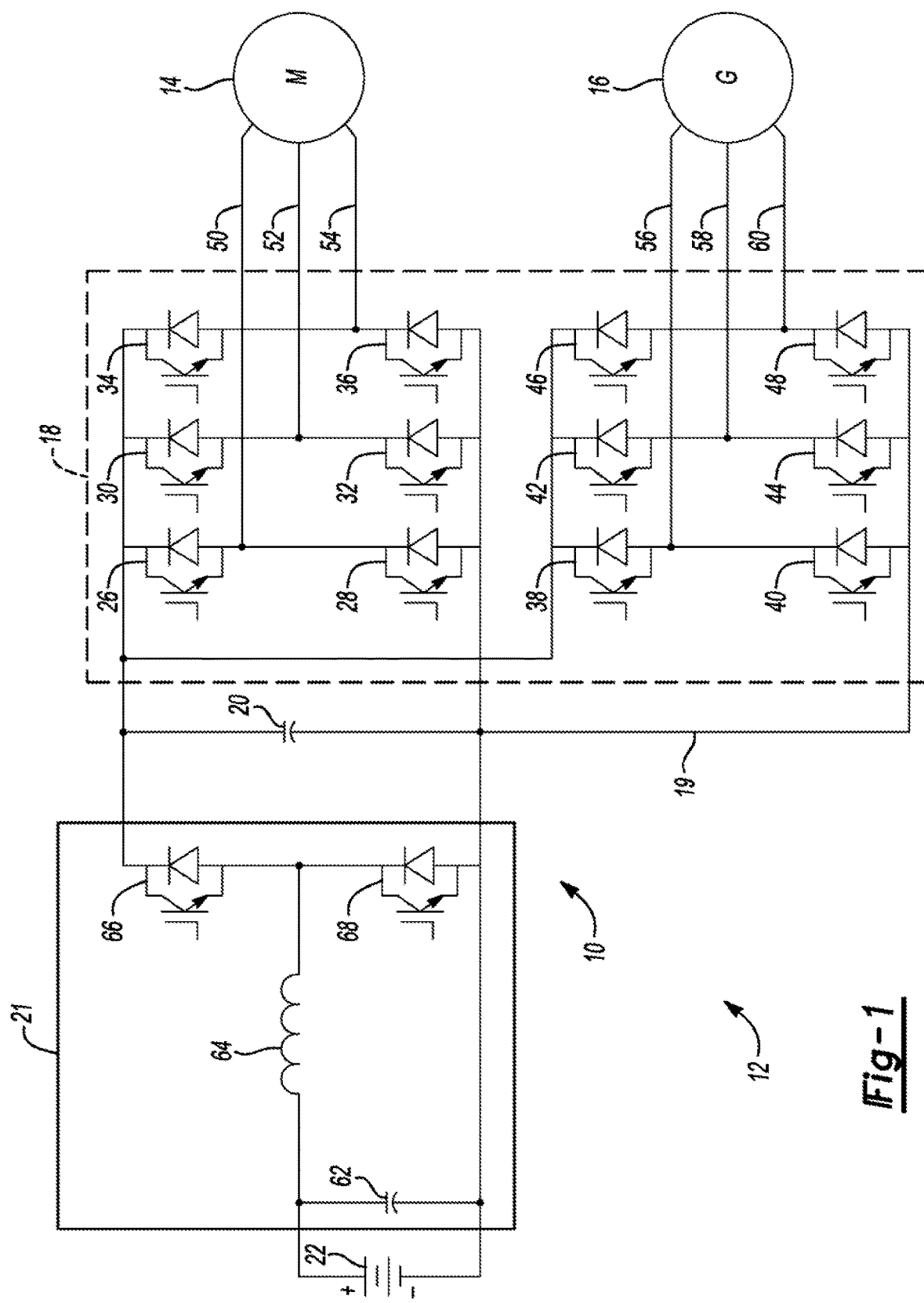
FIG. 1 is a schematic diagram of an electric drive system including a typical variable voltage converter.

With reference to FIG. 1, an electric drive system 10 for a vehicle 12 includes a motor 14, a generator 16, an inverter 18, a DC bus 19 including a DC link capacitor 20, a typical variable voltage converter 21, and a traction battery 22. Voltage from the traction battery 22 can be boosted by operation of the variable voltage converter 21 and passed to the DC bus 19 for use by the inverter 18 to supply power to the motor 14 to drive wheels of the vehicle 12. Likewise, voltage from the generator 16 (captured for example during regenerative braking) can be passed to the DC bus 19 and bucked by operation of the variable voltage converter 21 to store power within the traction battery 22.

The inverter 18 includes switches 26-48. These switches are arranged in usual fashion to service respective phase legs 50, 52, 54 and 56, 58, 60 of the motor 14 and generator 16 respectively. Pairs of the switches 26-36 can be selectively activated to permit power to flow between the DC bus 19 and motor 14. And pairs of the switches 38-48 can be selectively activated to permit power to flow between the generator 16 and DC bus 19.

The variable voltage converter 21 includes an input capacitor 62, an inductor 64, and a pair of switches 66, 68. The input capacitor 62 is in parallel with the traction battery 22. The switches 66, 68 are in series. One of the terminals of the inductor 64 is shared with the input capacitor 62. And the other of the terminals of the inductor 64 is shared with the switches 66, 68. As those of ordinary skill will recognize, the variable voltage converter 21 is a so-called input-capacitor-based variable voltage converter. The input capacitor 62 and inductor 64 work together to limit traction battery current ripple within a required range. A large capacitance and large inductance are usually necessary to achieve this purpose. Such configured components typically occupy significant packaging space, and impose cost, weight, and efficiency penalties. Moreover, cooling relatively large passive components can be challenging.

Figure 2:
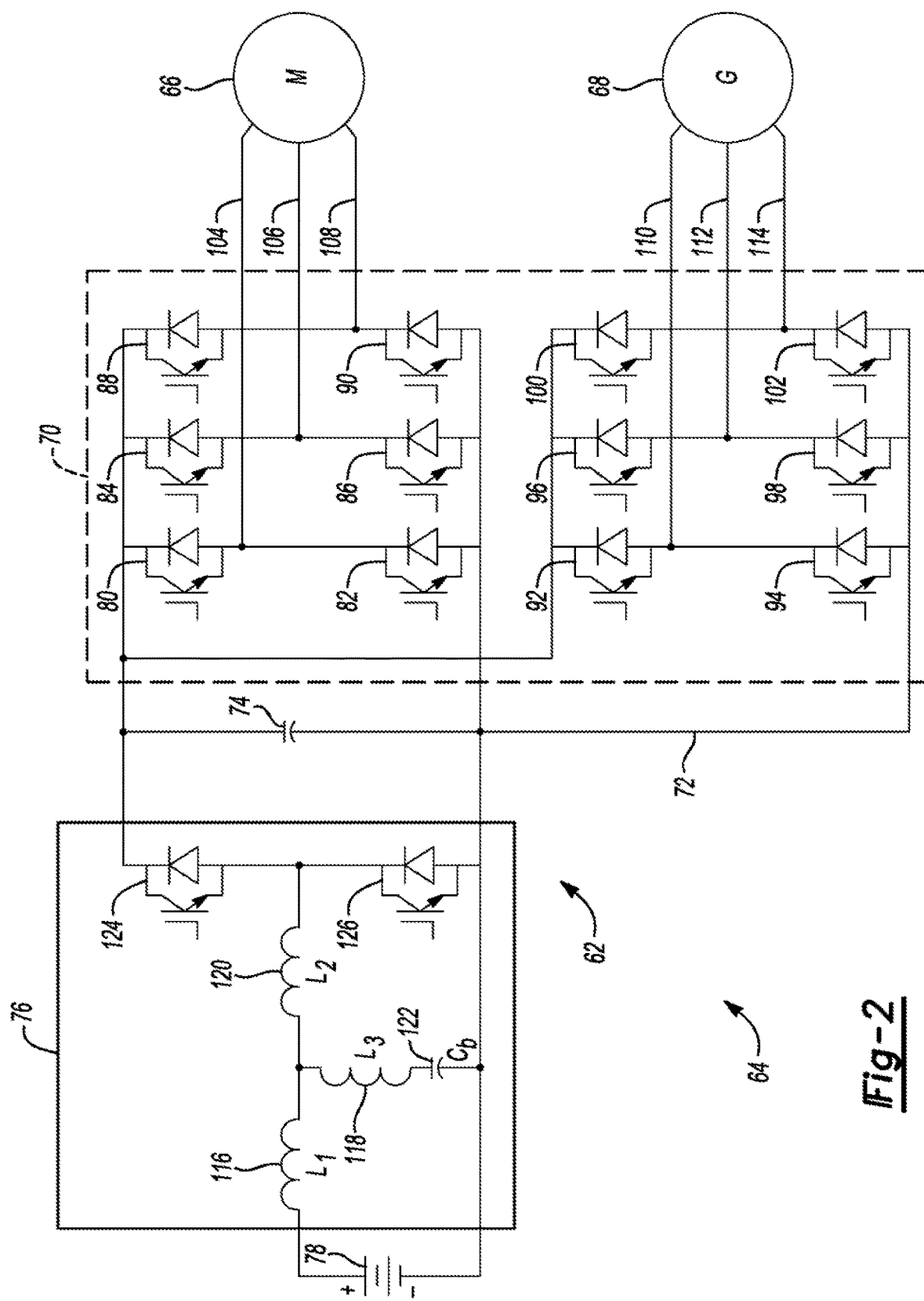
FIGS. 2 and 3 are schematic diagrams of electric drive systems including proposed variable voltage converters.

With reference to FIG. 2, an electric drive system 62 for a vehicle 64 includes a motor 66, a generator 68, an inverter 70, a DC bus 72 including a DC link capacitor 74, a variable voltage converter 76, and a traction battery 78. Voltage from the traction battery 78 can be boosted by operation of the variable voltage converter 76 and passed to the DC bus 72 for use by the inverter 70 to supply power to the motor 66 to drive wheels of the vehicle 64. Likewise, voltage from the generator 68 can be passed to the DC bus 72 and bucked by operation of the variable voltage converter 76 to store power within the traction battery 78.

The inverter 70 includes switches 80-102. These switches are arranged to service respective phase legs 104, 106, 108 and 110, 112, 114 of the motor 66 and generator 68 respectively. Pairs of the switches 80-90 can be selectively activated to permit power to flow between the DC bus 72 and motor 66. And pairs of the switches 92-102 can be selectively activated to permit power to flow between the generator 68 and DC bus 72.

The variable voltage converter 76 includes inductors 116, 118, 120, capacitor 122, and a pair of switches 124, 126. The inductors 116, 118, 120 are arranged in a T configuration and share a common terminal. The inductor 116 shares a terminal with the traction battery 78. The inductor 118 and capacitor 122 are in series. And the inductor 120 shares a terminal with the switches 124, 126. The inductor 118 and capacitor 122 are designed to meet the condition $\omega_2 L_3 C_b \approx 1$, where $\omega=2\pi f_s$, and $f_s$ is the switching frequency of the switches 124, 126. The inductor 118 and capacitor 122 provide a short circuit path for current ripple with frequency of $f_s$. As a result, there is much less current ripple flowing toward the traction battery 78, and the inductor 116 prevents current ripple from flowing into traction battery 78. A relatively small inductance $L_2$ for the inductor 120 is sufficient to achieve voltage boost. Even though this relatively small inductance can lead to high inductor current ripple, the traction battery 78 maintains relatively small current ripple because the inductor 116, inductor 118, and capacitor 122 effectively filter ripple current away from the traction battery 78. Moreover, the inductances $L_1$, $L_2$, $L_3$ and capacitance $C_b$ of the inductors 116, 120, 118 and capacitor 122 respectively have relatively small values. Therefore, the variable voltage converter 76 occupies less packaging space, is less expensive, lighter, and more efficient, and is easier to cool than the variable voltage converter 21.

Figure 3:
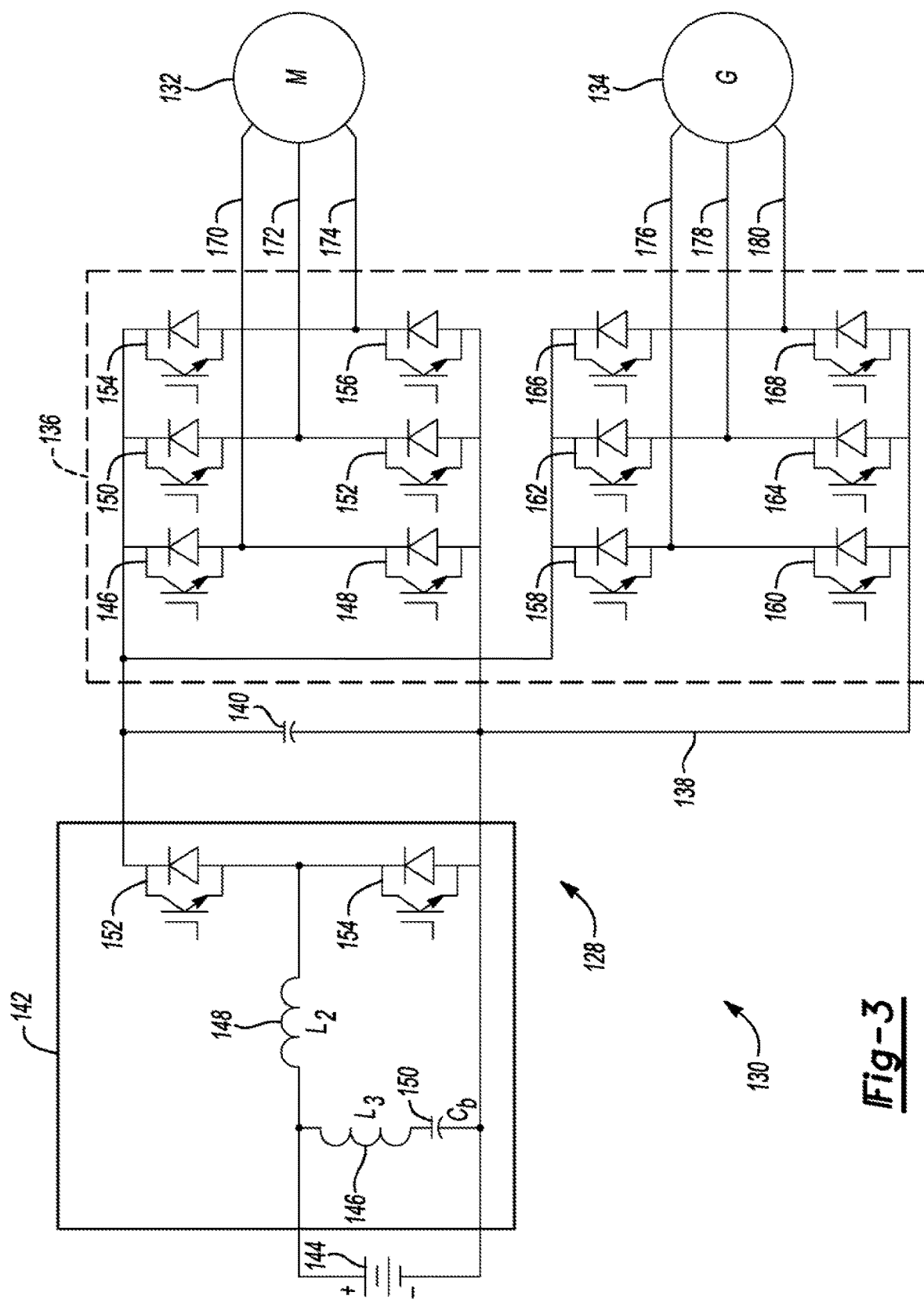

With reference to FIG. 3, an electric drive system 128 for a vehicle 130 includes a motor 132, a generator 134, an inverter 136, a DC bus 138 including a DC link capacitor 140, a variable voltage converter 142, and a traction battery 144. Voltage from the traction battery 144 can be boosted by operation of the variable voltage converter 142 and passed to the DC bus 138 for use by the inverter 136 to supply power to the motor 132 to drive wheels of the vehicle 130. Likewise, voltage from the generator 134 can be passed to the DC bus 138 and bucked by operation of the variable voltage converter 142 to store power within the traction battery 144.

The inverter 136 includes switches 146-168. These switches are arranged to service respective phase legs 170, 172, 174 and 176, 178, 180 of the motor 132 and generator 134 respectively. Pairs of the switches 146-156 can be selectively activated to permit power to flow between the DC bus 138 and motor 132. And pairs of the switches 158-168 can be selectively activated to permit power to flow between the generator 134 and DC bus 138.

The variable voltage converter 142 includes inductors 146, 148, capacitor 150, and a pair of switches 152, 154. The inductors 146, 148 and traction battery 144 share a common terminal. The inductor 146 and capacitor 150 are in series. And the inductor 148 shares a terminal with the switches 152, 154. Similar to the above, the inductor 146 and capacitor 150 are designed to meet the condition $\omega^2 L_3 C_b \approx 1$, where $\omega=2\pi f_s$, and $f_s$ is the switching frequency of the switches 152, 154.

Because traction battery 144 is connected to the variable voltage converter 142 through a cable, the traction battery side has internal resistance and stray inductance. The inductor 146 and capacitor 150 provides a short circuit path for current ripple with frequency of $f_s$, which will effectively filter most of the ripple current away from the traction battery 144. Also, the stray inductance of the battery side will block out high frequency ripple current away from the traction battery 144. Therefore, a small inductance $L_2$ for the inductor 148 is sufficient to boost voltage.

Figure 4:
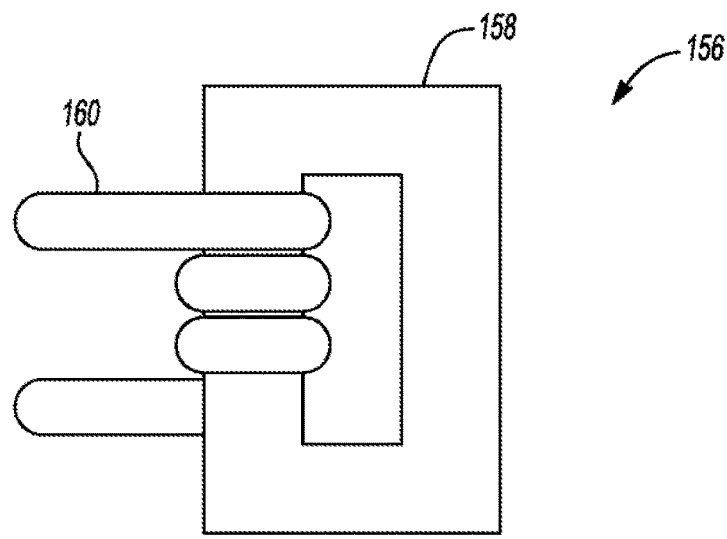
FIG. 4 is a schematic diagram of a non-gapped AC high frequency inductor.

With reference to FIG. 4, an AC high frequency inductor 156 includes a core 158 and coil 160 wrapped therearound. The inductors 118, 146 are of this type of configuration. Because only AC high frequency current ripple flows through the inductors 118, 146, there is no DC current through these inductors. As a result, the inductors 118, 146 have relatively small size and weight.

The inductor 118 and capacitor 122 provide a short circuit path for current ripple with frequency of $f_s$. As a result, there is much less current ripple flowing toward the traction battery 78, and the inductor 116 prevents current ripple from flowing into traction battery 78. A relatively small inductance $L_2$ for the inductor 120 is sufficient to achieve voltage boost. Even though this relatively small inductance can lead to high inductor current ripple, the traction battery 78 maintains relatively small current ripple because the inductor 116, inductor 118, and capacitor 122 effectively filter ripple current away from the traction battery 78. Moreover, the inductances $L_1$, $L_2$, $L_3$ and capacitance $C_b$ of the inductors 116, 120, 118 and capacitor 122 respectively have relatively small values. Therefore, the variable voltage converter 76 occupies less packaging space, is less expensive, lighter, and more efficient, and is easier to cool than the variable voltage converter 21.

Simulations were conducted to demonstrate the performance differences between the variable voltage converter 21 and the variable voltage converter 76. For these simulations, the voltage of the traction batteries 22, 78 was set to 200 V with an internal resistance of 0.2Ω, the duty cycle for the variable voltage converters 21, 76 was set to 0.308, circuitry of the inverters 18, 70 associated with the motors 14, 66 provided power to a load with 1 mH and 1.5Ω, at a modulation index of 0.784. For the variable voltage converter 21, L=130 µH and $C_b$=130 µF. For the variable voltage converter 76, $L_1$=60 µH, $L_2$=3 µH, $L_3$=5 µH, $C_b$=50 µF.

Figure 5A:
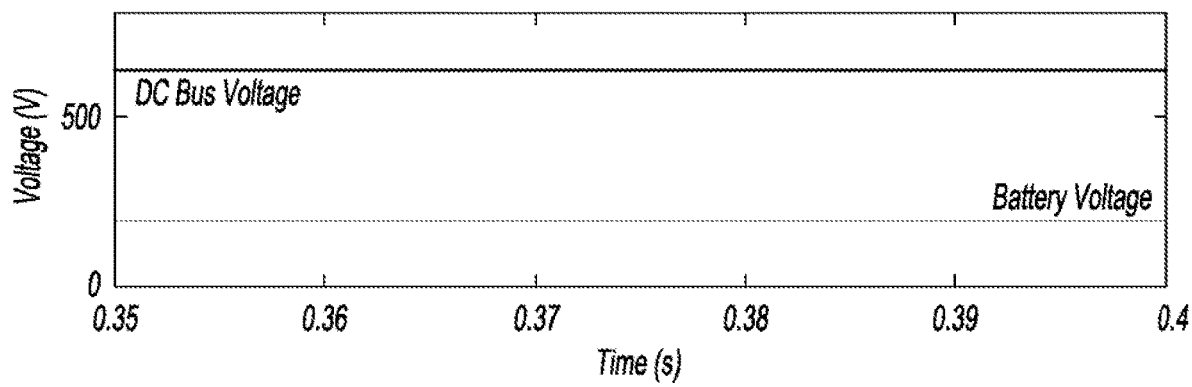
FIGS. 5A and 5B are plots of DC bus voltage, battery voltage, and load currents versus time for the electric drive systems of FIGS. 1 and 2.
Figure 5B:
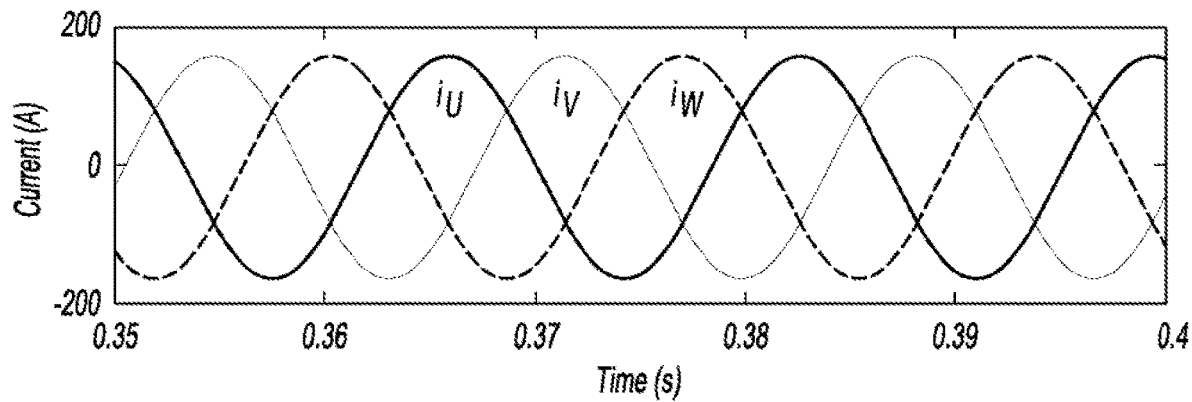
Figure 6A:
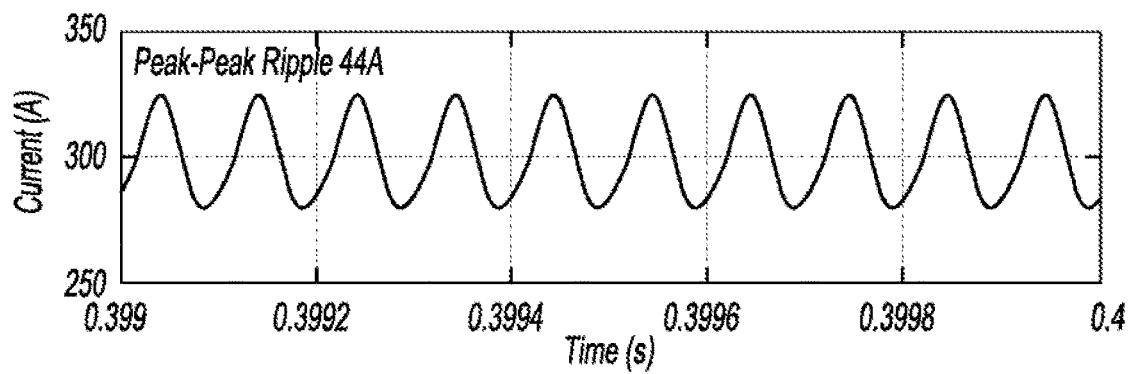
FIGS. 6A and 6B are plots of battery ripple current and inductor ripple current respectively for the electric drive system of FIG. 1.
Figure 6B:
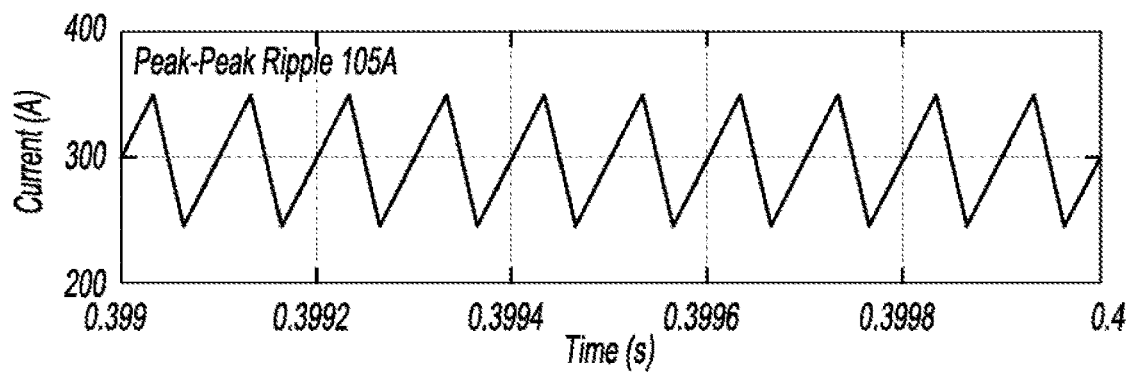
Figure 7A:
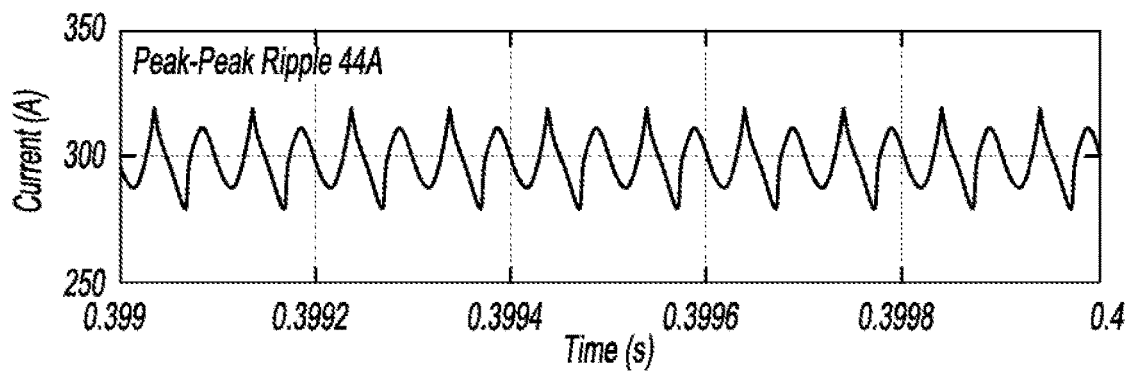
FIGS. 7A and 7B are plots of battery ripple current and inductor ripple current respectively for the electric drive system of FIG. 2.
Figure 7B:
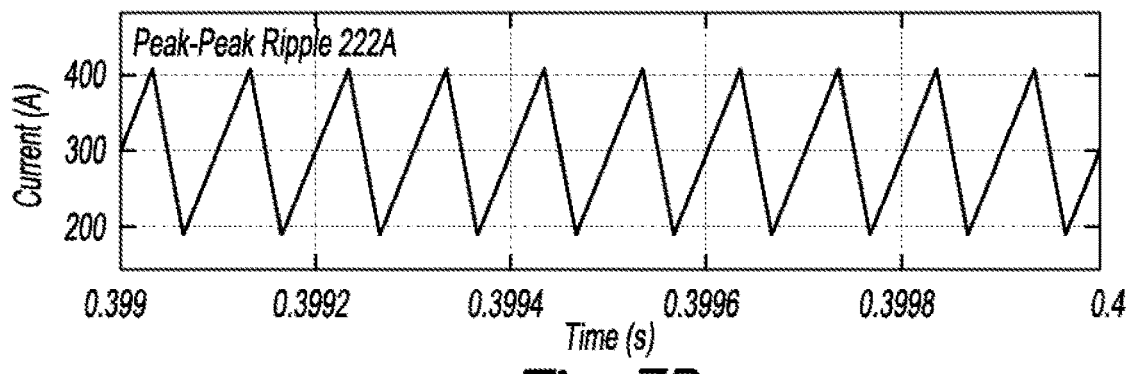

FIGS. 5A and 5B show that for both the variable voltage converters 21, 76, the DC bus voltages are 635 V, the battery average currents are 300 A, and the load currents are 115 $A_{rms}$. FIGS. 6A and 6B show that for the inverter 21, the peak-to-peak battery ripple current is 44 A and the peak-to-peak inductor ripple current is 105 A. FIGS. 7A and 7B show that for the inverter 76, the peak-to-peak battery ripple current is 44 A and the peak-to-peak inductor ripple current is 222 A. The variable voltage converter 76 has a total inductance of 68 µH and capacitance of 50 µF, whereas the variable voltage converter 21 has a total inductance of 130 pH and 130 µF capacitance.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as Read Only Memory (ROM) devices and information alterably stored on writeable storage media such as floppy disks, magnetic tapes, Compact Discs (CDs), Random Access Memory (RAM) devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

The words used in the specification are words of description rather than limitation, and it is understood that various changes may be made without departing from the spirit and scope of the disclosure and claims.

As previously described, the features of various embodiments may be combined to form further embodiments that may not be explicitly described or illustrated. While various embodiments may have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle electric drive comprising:
   a battery;
   an inverter, and
   a power converter, electrically between the battery and inverter, including series inductors, series switches activated at a predefined switching frequency, and a series capacitor and non-gapped inductor, the series inductors and non-gapped inductor having a T configuration and the non-gapped inductor defining an inductance proportional to an inverse of a product of a capacitance of the capacitor and the switching frequency squared.

2. The vehicle electric drive of claim 1, wherein the inductance is further proportional to an inverse of a product of the capacitance, the switching frequency squared, four, and pi squared.

3. The vehicle electric drive of claim 2, wherein the inductance is equal to the inverse of the product of the capacitance, the switching frequency squared, four, and pi squared.

4. The vehicle electric drive of claim 1, wherein the inductance is an order of magnitude less than an inductance of one of the series inductors.

5. The vehicle electric drive of claim 1, wherein one of the series inductors, the non-gapped inductor, and the capacitor are in parallel with the battery.

6. The vehicle electric drive of claim 1, wherein the series inductors include no more than two inductors.

7. The vehicle electric drive of claim 1 further comprising a motor, wherein the inverter is configured to provide power to the motor.

8. A vehicle electric drive comprising:
   a battery;
   an inverter, and
   a converter, electrically between the battery and inverter, including a series capacitor and non-gapped inductor in parallel with the battery, series switches activated at a predefined switching frequency, and an inductor electrically between the non-gapped inductor and series switches, the non-gapped inductor defining an inductance proportional to an inverse of a product of a capacitance of the capacitor and the switching frequency squared.

9. The vehicle electric drive of claim 8, wherein the inductance is further proportional to an inverse of a product of the capacitance, the switching frequency squared, four, and pi squared.

10. The vehicle electric drive of claim 9, wherein the inductance is equal to the inverse of the product of the capacitance, the switching frequency squared, four, and pi squared.

11. The vehicle electric drive of claim 8 further comprising a motor, wherein the inverter is configured to provide power to the motor.

12. A vehicle electric drive comprising:
    a battery;
    an inverter; and
    a power converter, electrically between the battery and inverter, including series switches activated at a predefined switching frequency, a series capacitor and non-gapped inductor, and an inductor electrically between the non-gapped inductor and series switches, the battery, non-gapped inductor, and inductor sharing a common terminal and the non-gapped inductor defining an inductance proportional to an inverse of a product of a capacitance of the capacitor and the switching frequency squared.

13. The vehicle electric drive of claim 12, wherein the series capacitor and non-gapped inductor are in parallel with the battery.

14. The vehicle electric drive of claim 12, wherein the inductance is further proportional to an inverse of a product of the capacitance, the switching frequency squared, four, and pi squared.

15. The vehicle electric drive of claim 14, wherein the inductance is equal to the inverse of the product of the capacitance, the switching frequency squared, four, and pi squared.

16. The vehicle electric drive of claim 12 further comprising a motor, wherein the inverter is configured to provide power to the motor.

* * * * *